Dec. 29, 1953   H. NUSSHOLD   2,663,927
SAWING MACHINE
Filed Sept. 17, 1949   5 Sheets-Sheet 1
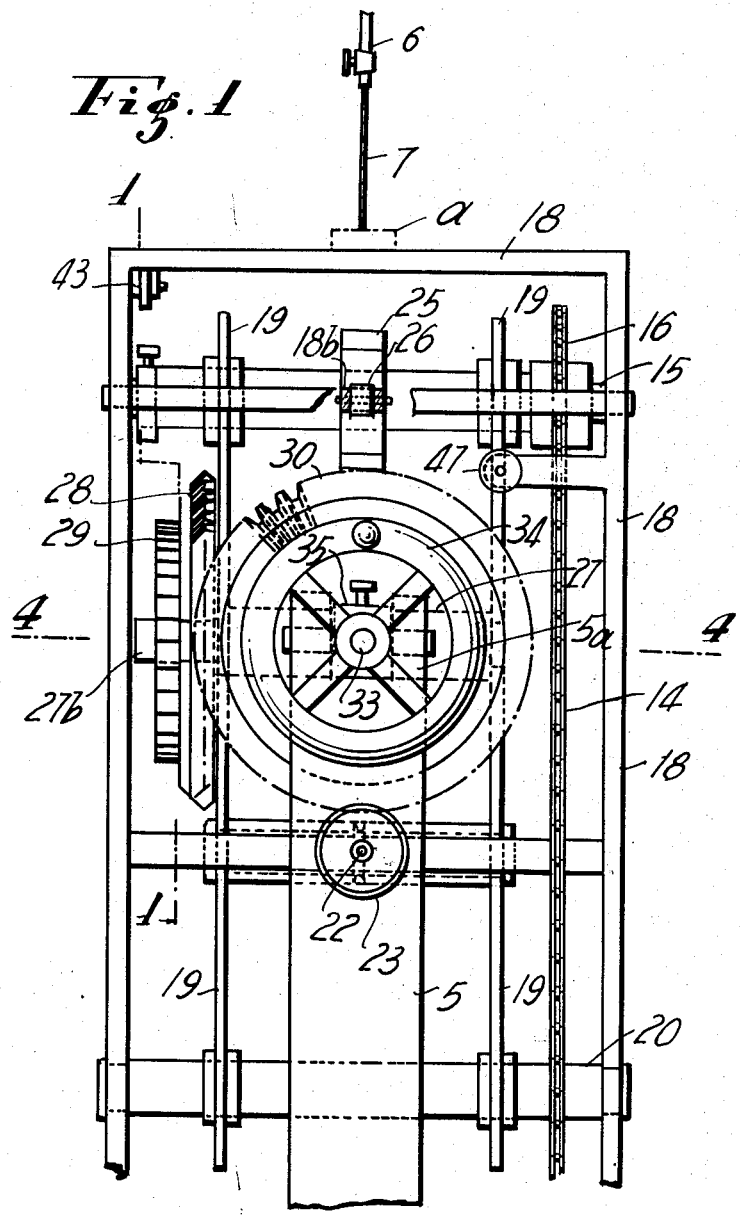
INVENTOR:
HUGO NUSSHOLD
BY Leon M. Strauss
AT.

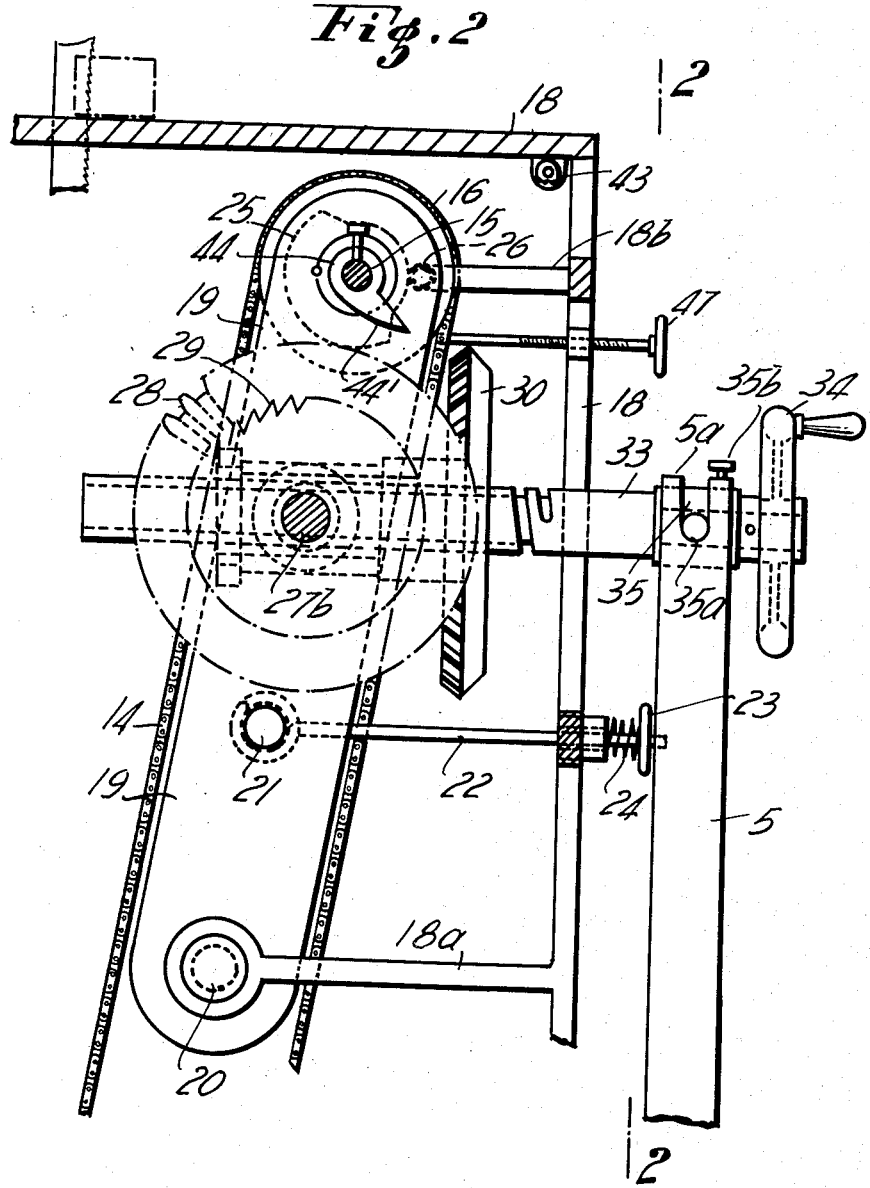

Dec. 29, 1953 H. NUSSHOLD 2,663,927
SAWING MACHINE
Filed Sept. 17, 1949 5 Sheets-Sheet 3
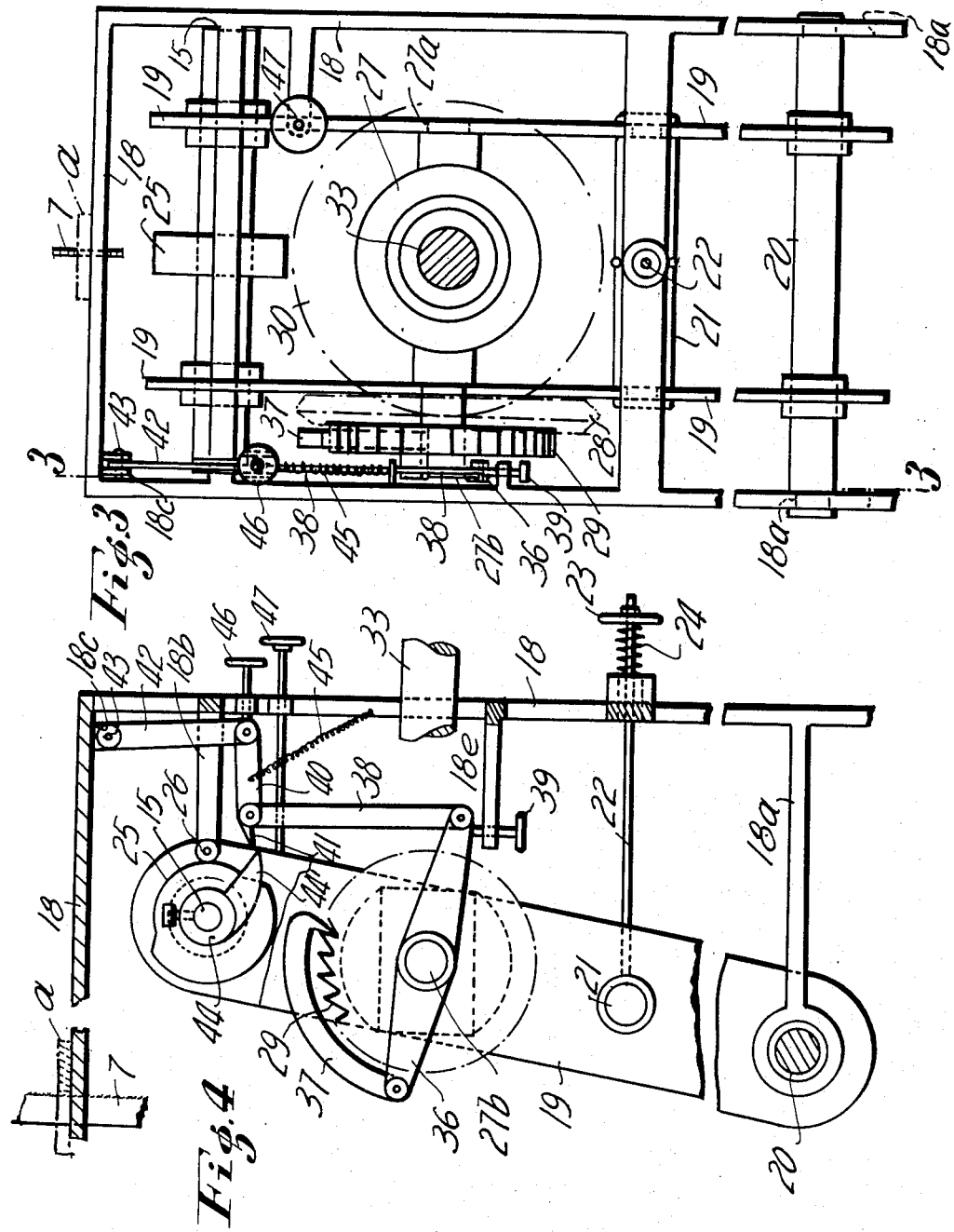
INVENTOR:
HUGO NUSSHOLD Dec. 29, 1953
H. NUSSHOLD
2,663,927
SAWING MACHINE
Filed Sept. 17, 1949
5 Sheets-Sheet 4
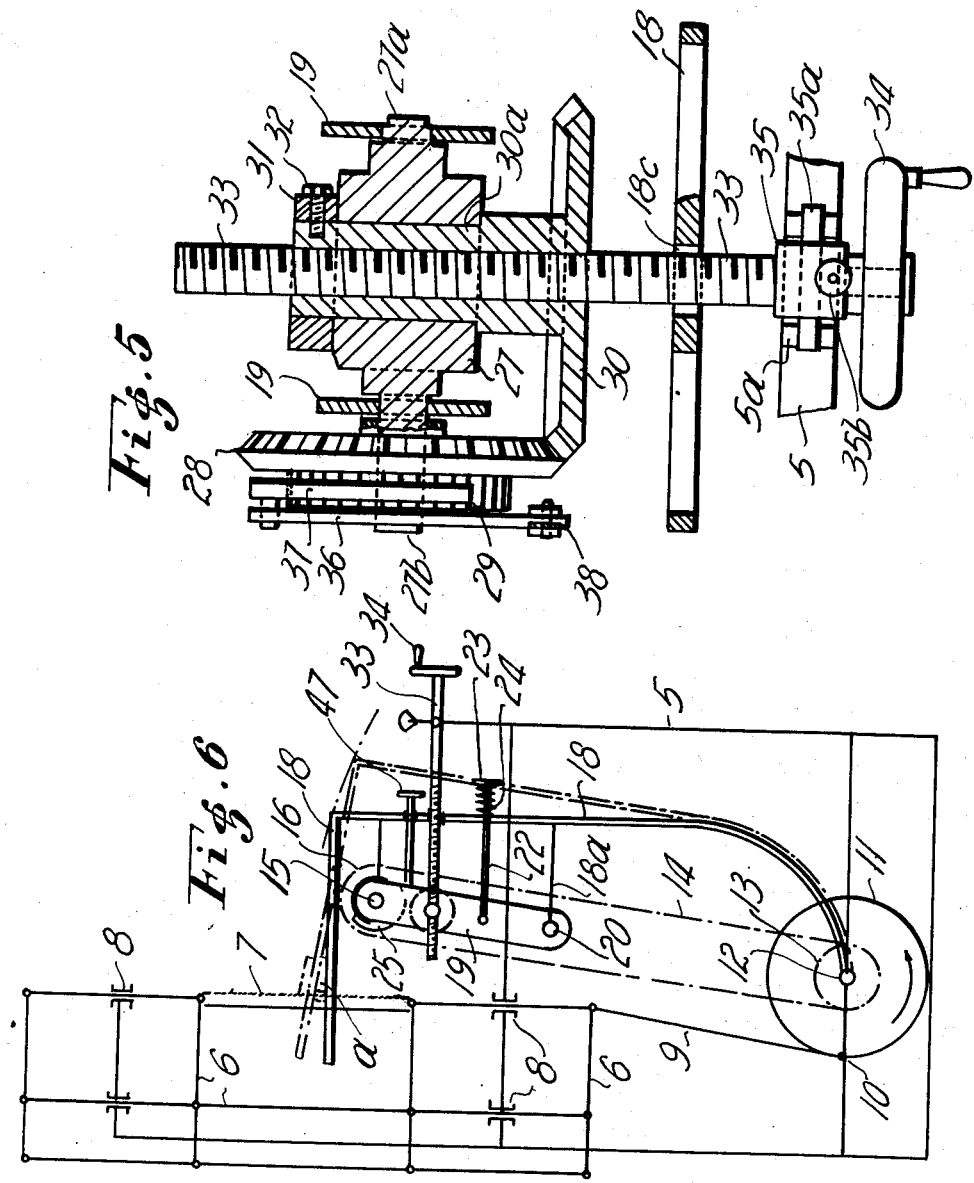
INVENTOR:
HUGO NUSSHOLD Dec. 29, 1953     H. NUSSHOLD     2,663,927
SAWING MACHINE
Filed Sept. 17, 1949     5 Sheets-Sheet 5
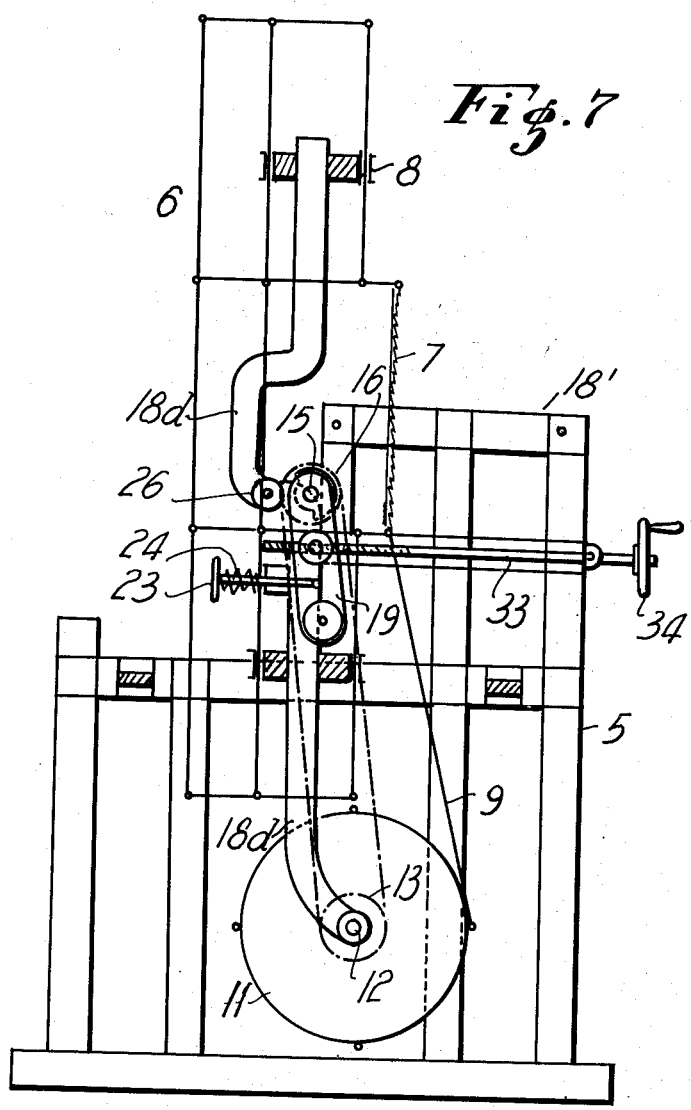
INVENTOR:
HUGO NUSSHOLD Patented Dec. 29, 1953

2,663,927

UNITED STATES PATENT OFFICE 2,663,927

SAWING MACHINE

Hugo Nusshold, Buenos Aires, Argentina

Application September 17, 1949, Serial No. 116,271

1 Claim. (Cl. 29—74)

The present invention relates to machines for working metals, or other substances, and essentially has for its object to provide a machine capable of performing a variety of different operations, such as, sawing, filing, dove-tailing, trimming, broaching and, in general, any other operation wherein the tool is to be moved in a rectilinear reciprocating motion.

One object of the invention is to provide a machine of this type wherein the work supporting table is constituted by a movable frame mounted in a manner relatively independent from the main frame and carries the necessary mechanism for advancing or retracting the table in respect to the reciprocating tool holder.

Another object of the invention is to provide simple and effective means for varying the angular position of said movable work-supporting table relative to the working plane of the tool.

A further object of the invention is to provide novel means whereby the work supporting table, during each idle stroke of the tool, is effectively moved out of engagement with the latter, thus preventing undue wear or damage thereof.

A still further object of the invention is to provide simple and efficient means for changing the feed drive of the work supporting table from manual to automatic.

Other objects and advantages of the invention will become apparent from the following detailed description which should be read in conjunction with the appended drawings illustrating, by way of example, one preferred embodiment thereof.

In the drawings:

Fig. 1 is a schematic front elevation illustrating part of the mechanism of the machine;

Fig. 2 is a sectional view on line 1—1 of Fig. 1;

Fig. 3 is a front sectional view on the line 2—2 of Fig. 2;

Fig. 4 is a sectional side view on the line 3—3 of Fig. 3;

Fig. 5 is a sectional view taken along the center line 4—4 in Fig. 1;

Fig. 6 is a schematic side elevation of the machine showing the general arrangement of parts; and Fig. 7 illustrates, in a schematic side view, a modified form of one part of the invention.

Referring particularly to Figs. 1 to 6, a machine according to the invention comprises a fixed main frame 5 and a tool holder 6 mounted in conventional guide members for vertical reciprocating movement and adapted to interchangeably hold a variety of different tools, such as, saw-blades, files, broaches, and the like. For the sake of simplicity, in the drawings a saw-blade 7 is shown.

The tool holder 6 is guided for vertical movement in bushings 8 provided at convenient points of said main frame 5, and is adapted to be moved in a rectilinear reciprocating motion by means of a pitman 9 (Fig. 6), journaled at one end to a pin 10 adjustably fixed to a crank disc 11 which in turn is secured to the drive shaft 12 horizontally mounted for rotative movement in the aforementioned main frame 5. The shaft 12 is rotated in any desired manner from a conventional source of power (not shown) and carries a fixedly secured sprocket wheel 13 for engagement with an endless chain drive 14 adapted to transmit motion to a second sprocket wheel 16 secured to a shaft 15, as will be described hereinafter.

A work supporting table 18 having a flat top and downwardly extending side and front portions is loosely mounted at its lower part on drive shaft 12 so as to be capable of effecting oscillations in a forward and backward direction, relative to the working tool, as will be explained hereinafter.

The driven shaft 15 with its ends is journaled in suitable bearings provided in the top portion of two parallel plate members 19, 19, which extend downwardly within said table 18, and at their lower ends are loosely mounted on a transverse axle 20 secured to supporting arms 18a depending from table 18.

As is clearly shown in Figs. 3 and 4, at a point approximately midways between the ends of plate members 19, 19, the latter are rigidly connected to each other by means of a bolt 21 to which is connected one end of a tensioning member 22 (Fig. 2) the other end of which freely extends through a hole in the front member of table 18 and carries at its free end a threaded hand-wheel 23 co-acting with a helical compression spring 24 which embraces the end of member 22. Thus, this arrangement provides an elastic connection between the work supporting table 18 and said two-plate unit 19, 19, which may be adjusted to the extent desired by turning the hand-wheel 23 in either direction.

The driven shaft 15 carries rigidly secured thereto a cam wheel 25 which during its rotation engages with a roller 26 rotatably mounted at the end of a bracket 18b fixedly secured to the table 18 (Figs. 2 and 4). This arrangement, in conjunction with parts 22, 23, 24, has the object of moving the table 18 with the work piece a thereon, during each idle stroke of the tool 7, out of engagement with the latter so as to prevent useless frictional contact therewith and undue wear of the tool. It will of course be understood that the position of cam wheel 25 on shaft 15 will be such as to warrant an exact synchronization between its action and the working and idle strokes of tool holder 6.

A hub 27 having depending stub-shafts 27a and 27b (Figs. 3 and 5) is secured within plate members 19, 19 and stub-shaft 27b, which is extended a certain distance beyond the corresponding plate member 19, loosely supports a bevel gear 28 fixedly secured to a ratchet wheel 29 of a step-by-step feed mechanism. The bevel gear 28 meshes with a further bevel gear 30 arranged at 90° to the former and having a hollow projecting hub 30a rotatably housed in a corresponding bore formed in hub 27, the free end of part 30a being retained in position against longitudinal displacement by means of a collar 31 and set screw 32.

The hub portion 30a of bevel gear 30 is internally threaded and engages with its screw threads a feed screw 33 which extends from the main frame 5. The feed screw freely passes through a bore 18c in the front member of table 18 (Fig. 5) and at its outer free end carries a hand-wheel 34 fixedly secured thereto. The feed screw 33 is retained against longitudinal displacement by means of a bushing 35 having depending trunnions 35a engaged in a forked extension 5a of main frame 5 (see also Figs. 1 and 2).

The stub-shaft 27b of hub 27 also carries, adjacent the bevel gear 29, a loosely mounted balance beam 36, supporting at the end of one of its arms a pivoted pawl 37 the free end of which is adapted to engage the teeth of ratchet wheel 29, in a manner known per se, the other arm of said balance beam being linked to a connecting rod 38 (Figs. 3, 4 and 5). The extent of downward movement of this arm may be adjusted as required by means of an adjusting screw 39 threaded into a bracket 18e depending from the table 18 (Fig. 4).

The connecting rod 38 extends upwardly to a point in the vicinity of driven shaft 15 and at its free end is linked to the end of a link 40 which has a nose 41 and is linked at its other end to a floating bracked 42 pivotally connected to table 18 at 43.

The nose 41 of link 40 may be engaged by a projection 44' of a cam wheel 44 secured to driven shaft 15, the arrangement being such that when, during rotation of the cam wheel 44, its projection 44' engages the nose 41, the connecting rod 38 is lifted in upward direction thus rocking the balance beam 36 with its pawl 37 which in turn rotates the ratchet wheel to an extent as previously determined by the adjustment of an adjusting screw 46 guided in a screw-threaded bore provided in the front member of table 18. As shown in Figs. 3 and 4, the return movement of link 40 is brought about by a helical tension spring 45 secured at its ends to said link 40 and to the table 18.

Figs. 1, 2, 3 and 6 illustrate means for varying the angular position of the work supporting table in respect to the working plane of the tool. This is accomplished by a screw-threaded rod 47 provided at its free outer end with a conventional hand-wheel or the like, and which is guided in a screw-threaded bore formed in the front member of table 18, the inner end of the said rod abutting against one of the plate members 19. As will be apparent to those skilled in the art, the combined effect of rods 47 and 22 and feed screw 33 permits of varying, within certain limits, the angular plane of table 18 relative to the working plane of the tool 7, as is clearly shown in dotted lines in Fig. 6.

In Fig. 7 there is illustrated a modification of the arrangement for withdrawing the work piece from engagement with the tool during each idle stroke of the latter. In this case, the work supporting table 18' may be fixed and the roller 26 is mounted so as to engage with the guide member 18d of the holder 6 supporting the tool 7. This modification is particularly convenient in certain cases, for instance, of heavy or bulky work pieces. As will be understood, in this case the receding movement, at each idle stroke of the tool, is not effected by the work supporting table but by the tool holder itself, the remainder of the mechanism being substantially the same as described with reference to Figs. 1 to 6.

In the following detailed description of the operation of the machine, it will be assumed that the same has been prepared for effecting a cutting operation as by means of a saw blade 7. However, it will be found that the use of the machine is not limited to this type of tool but that the holder 6 may be adapted for the application of any tool exerting its action on the work piece through a rectilinear reciprocating movement, such as files, broaches and the like.

Referring to the embodiment illustrated in Figs. 1 to 6, the machine will be driven by any convenient power source rotating drive shaft 12 (Fig. 6) which, through crank disc 11, pin 10 and pitman 9, provides for vertical reciprocation of the tool holder 6 with tool 7 in the guides 8.

By means of the sprocket wheel 13 which is rotated from drive shaft 12, and the endless chain 14, rotary motion is imparted to the driven shaft 15 through sprocket wheel 16, this drive being continued as long as drive shaft 12 is rotated.

Assuming a work piece a has been fixed in a conventional manner to the upper side of table 18, the adjusting screw 35b is loosened and the feed screw 33 is rotated by means of the hand wheel 34 so as to bring the work piece a in engagement with the edge of the saw blade 7. As may be seen from the drawings, particularly Fig. 5, this adjusting movement is brought about by the rotation of feed screw 33 in engagement with the screw threads of hub 30a of the bevel gear 30, whereby the hub 27 connected through plate members 19 to the table 18, which at its lower end is loosely mounted on shaft 12, is moved in a forward direction placing the table 18 in position where the work piece a may be worked upon by the saw blade 7.

During operation of the machine, the work supporting table 18 is periodically oscillated about its pivotal arrangement on shaft 12, by means of the cam wheel 25 mounted on the driven shaft 15, co-acting with the roller 26 on bracket 18b secured to the table 18, the cam wheel 25 being adjusted in position on shaft 15 so as to effect its rotation in synchronism with the active and idle strokes of tool 7. In other words, during rotation of the same wheel 25, when its portion of smaller diameter engages the roller 26 the unit formed of the plate members 19, 19, at its upper end is moved towards table 18 under the yieldable tension effected by rod 22 and spring 24 and, contrarily, when said roller 26 is engaged by the portion of greater diameter of cam wheel 25, a separation between table 18 and the unit 19, 19 takes place and thus the table 18 is rocked in either direction in synchronism with each stroke of tool holder 6 so that the table 18 and work piece a thereon is moved away from the latter at each idle stroke thereof, whereas it is moved towards and in contact with the tool 7 when the latter is effecting its active stroke. The tensioning member 22 not only serves for maintaining the cam wheel 25 in constant frictional contact with roller 26, but by means of hand wheel 23 and compression spring 24 it may be used for adjusting the cutting force of tool 7 upon the work piece a by simply turning said hand wheel to the right or to the left.

When the feeding movement of the work supporting table 18 is manually effected by means of hand wheel 34 secured to feed screw 33, the adjusting screw 47 must of course be screwed home into the front member of table 18 so as to move the unit 19, 19 away from the latter thereby placing the nose 41 beyond the reach of projection 44' on driven shaft 15 and thus disconnecting the automatic feed mechanism to be described hereinafter. In this condition, the table 18 may be progressively advanced through rotation of the feed screw 33 playing in the screw-threaded bore of hub 30a mounted in turn in the hub member 27 journaled to plate members 19, 19 which, as already explained, are yieldably connected to table 18.

When it is desired to use the automatic feed mechanism for the work supporting table 18, the feed screw 33 is locked against rotation by means of the set screw 35b and member 47 is turned so as to permit the unit 19, 19 and associated parts to approach the inner front side of table 18 until the nose 41 is positioned within the reach of rotatory projection 44'.

During operation, at each rotation of shaft 15 imparted through chain drive 14 and sprocket wheel 16, the end of projection 44' engages the nose 41 carrying it upwards whereby, through rod 38, the balance beam 36 is rocked and its other arm actuates the pawl 37 engaging with its free end in the teeth of ratchet wheel 29 which is thus advanced in a step-by-step movement. Since ratchet wheel 29 is rigidly secured to bevel gear 28 in mesh with bevel gear 30, rotation of the latter on feed screw 33 and within the hub member 27 journaled to plate members 19, provides for longitudinal displacement of the unit along feed screw 33, and of table 18. The extent of each advancing step of table 18 and work piece a, in accordance with the progressive action of tool 7, may be adjusted by means of adjusting screw 46 so as to vary the relative position of the contacting faces of nose 41 and projection 44', thereby increasing or reducing the extent of each intermittent rotation of ratchet wheel 29 and associated parts as imparted thereto by balance beam 36 and connecting rod 38.

As will be clearly apparent from Fig. 4, the adjusting screw 46, besides serving for adjusting the extent of stepwise feed of the table 18 may also be used, in lieu of member 47, for effecting the change from manual to automatic feed, or vice versa, of said table and working piece thereon, since such screw when turned sufficiently in one or the other direction, will place the nose 41 in, into or out of engagement with the co-acting projection 44'.

Fig. 6 clearly illustrates the possibility of having the reciprocating tool working upon the work piece at different angles. As is shown in Fig. 6 in dot and dash lines, this adjustment may be effected by the combined action of screw-threaded member 47, tensioning member 22 and feed screw 33.

Finally, in Fig. 7 is shown a modification of the arrangement for obtaining a receding movement of the table 18 and work piece thereon at each upward, or idle, stroke of tool holder 6. In this case, table 18' is fixed and the roller 26 is mounted on the tool holder which, thus, is moved apart from the work piece at each idle stroke due to the effect of cam wheel 25.

Having thus fully described and ascertained the nature of my said invention, and the manner in which the same is to be performed and carried into practice.

What I claim is:

In a machine having a main frame, a tool holder mounted for rectilinear reciprocating movement on said main frame and adapted to be operated from a driven shaft, and a movable work supporting table for carrying the work piece into and out of engagement with the tool when applied to said holder; a drive shaft, means operatively connecting said drive shaft to said driven shaft, plate-shaped frame means journaled on and extending from said driven shaft to said table, elastic connection means extending between said table and said plate-shaped frame means and including means for varying the angular position of said table relative to said tool holder, a cam seated on said driven shaft and operatively connected with a portion of said main frame whereby said work table may be rocked with said work piece when placed thereon, into and out of engagement with said tool, an automatic step-by-step feed mechanism for said work piece supported by said plate-shaped frame means and extending to said work table, said feed mechanism including a feed screw and link means, one of said link means being provided with a nose, a projection provided on said cam, whereby upon rotation of said driven shaft said projection engages said nose of said one link means to thereby move another of said link means, means operatively connected to said other link means and including a pawl, gear means carried by said plate-shaped frame means and adapted to be engaged by said pawl, whereby movements from said driven shaft are transferred through said link means and said pawl to said gear means, said gear means being operatively connected to said feed screw, whereby said table is moved relative to said tool, and means for disconnecting said nose from said cam projection to thereby effect change from automatic to manual feed operation.

HUGO NUSSHOLD.

References Cited in the file of this patent

UNITED STATES PATENTS

| Number | Name | Date |
|---|---|---|
| Re. 14,542 | Embree | Oct. 29, 1918 |
| 1,073,252 | Lauterjung | Sept. 16, 1913 |
| 1,467,525 | Banker | Sept. 11, 1923 |
| 1,513,629 | Runnels | Oct. 28, 1924 |

FOREIGN PATENTS

| Number | Country | Date |
|---|---|---|
| 2,365 | Great Britain | Sept. 14, 1866 |